(12) United States Patent
Halimi et al.

(10) Patent No.: US 9,593,453 B2
(45) Date of Patent: Mar. 14, 2017

(54) WALK-BEHIND COMPACTION ROLLER INCORPORATING NOISE REDUCTION MEASURES

(71) Applicant: Wacker Neuson Production Americas LLC, Menomonee Falls, WI (US)

(72) Inventors: Arber Halimi, Hartland, WI (US); Paul Sina, Jackson, WI (US)

(73) Assignee: Wacker Neuson Production Americas LLC, Menomonee Falls, WI (US)

( * ) Notice: Subject to any disclaimer, the term of this patent is extended or adjusted under 35 U.S.C. 154(b) by 0 days.

(21) Appl. No.: 14/671,052

(22) Filed: Mar. 27, 2015

(65) Prior Publication Data
US 2016/0281303 A1 Sep. 29, 2016

(51) Int. Cl.
*E01C 21/00* (2006.01)
*E01C 19/28* (2006.01)
*F16C 3/22* (2006.01)

(52) U.S. Cl.
CPC .......... *E01C 19/283* (2013.01); *E01C 19/286* (2013.01); *E01C 21/00* (2013.01); *F16C 3/22* (2013.01)

(58) Field of Classification Search
CPC ...... E01C 19/283; E01C 19/286; E01C 21/00; F16C 3/22
USPC ......................................... 404/104, 117, 131
See application file for complete search history.

(56) References Cited

U.S. PATENT DOCUMENTS

| | | | | |
|---|---|---|---|---|
| 2,133,862 A | * | 10/1938 | Kerns | E01C 19/27 404/117 |
| 2,306,089 A | * | 12/1942 | Tamblyn | E01C 19/407 404/112 |
| 3,698,293 A | * | 10/1972 | Wagner | E01C 19/282 404/103 |
| 3,778,177 A | * | 12/1973 | Haker | E01C 19/288 404/103 |
| 3,897,165 A | | 7/1975 | Vural | |
| 4,313,691 A | | 2/1982 | Yargici | |
| 4,614,486 A | * | 9/1986 | Bragagnini | E04G 21/10 404/103 |
| 5,664,908 A | * | 9/1997 | Paladeni | E04G 21/10 404/103 |

(Continued)

OTHER PUBLICATIONS

Wacker Neuson RD-7 Walk-Behind Roller: http://www.wackerneuson.us/en/products/pg/walk-behind-rollers-1/prod/rd-7.html.

(Continued)

*Primary Examiner* — Raymond W Addie
(74) *Attorney, Agent, or Firm* — Boyle Fredrickson, S.C.

(57) ABSTRACT

A vibratory compaction roller has a pretensioning mechanism that exerts a pretension or biasing force between the drum and the motor housing that inhibits relative axial movement between the output shaft of each drive motor and the associated motor housing, thus significantly reducing the generation of noise that would otherwise be created during machine operation. The pretensioning mechanism may take the form of one or more springs positioned between the drum and a drum support that also supports the motor. Bushings are provided between the springs and the drum to accommodate rotational motion between each spring and the drum. Alternatively, the pretensioning mechanism may be provided on a side of the drum opposite the motor and may pull the drum away from the motor.

17 Claims, 10 Drawing Sheets

(56) References Cited

U.S. PATENT DOCUMENTS

| | | | | |
|---|---|---|---|---|
| 6,302,620 B1 * | 10/2001 | Mutsuji | ............... | E01C 19/283 |
| | | | | 404/117 |
| 6,409,425 B1 * | 6/2002 | Okabe | ................. | E01C 19/283 |
| | | | | 404/117 |
| 7,704,012 B2 * | 4/2010 | Lura | .................... | E04G 21/066 |
| | | | | 404/118 |
| 8,221,027 B2 * | 7/2012 | Lura | ...................... | E01C 19/24 |
| | | | | 404/101 |
| 8,414,220 B1 * | 4/2013 | Koba | .................. | E01C 19/281 |
| | | | | 404/117 |

OTHER PUBLICATIONS

Bomag Walk-Behind Roller; http://www.bomag.com/world/en/construction-equipment-dictionary-walk-behind-rollers.html.
Atlas Copco Dynapac LP6500 Duplex Roller; http://www.dynapac.com/en/Products/?product=613@cat=16.
Mutiquip MRH601DS Walk-Behind Tandem Drum Roller; http://www.multiquip.com/multiquip/MRH601DS/htm.
Wacker Neuson RD-7 Walk Behind Roller; Opeartor's Manual.

\* cited by examiner

WALK-BEHIND COMPACTION ROLLER INCORPORATING NOISE REDUCTION MEASURES

BACKGROUND OF THE INVENTION

Walk-behind vibratory compaction rollers are used to compact soil and asphalt in order to provide a firm foundation for structural building, to reduce future settlement of soil, or to compact asphalt for pathway, road, and parking lot construction. Such machines commonly are controlled by a single operator who follows behind the machine to direct the machine's travel direction and actuate its controls. Such machines may have one drum (single-drum) or two drums (dual-drum) acting as compaction surface(s). In order to enhance compaction, each drum is excited to vibrate by an exciter assembly associated with the drum. Commonly, a control arm extends rearwardly from the machine and provides the mechanical advantage to allow the operator to physically manipulate the direction of travel of the machine.

Vibratory rollers typically have either "center excitation" in which an exciter assembly is positioned between front and rear drums or "in-drum excitation" in which an exciter assembly is positioned within each drum that is excited. High vibration levels inducted in all vibratory compaction rollers can cause machine components to resonate at different frequencies. In some cases, the vibrating components can generate high sound levels on their own and/or through interaction with other components. The resulting noise is problematic because vibratory machines must meet strict sound limit regulations in various countries (particularly in the European Union). Measures therefore usually are taken to reduce noise generation. These measures typically include the use of design principals including resonance avoidance and the provision of dampening systems.

Noise reduction efforts are complicated by the basic design of vibratory compaction rollers. The drum or drums typically are mounted on a lower frame, and the engine, controls, and other components are mounted on an upper frame that is mounted on the lower frame via vibration isolating mechanisms such as shock mounts. In the case of a center-mounted exciter assembly, the exciter is mounted, or built into, the lower frame. Bearings and hydraulic drive motors are positioned between the drum supports and drums. These components between the lower frame and the drums require the provision of tolerance in the form of gaps between them to allow for relative movement therebetween while preventing binding. The large number of components leads to a large tolerance stack-up, even if many of the components are precision machined. Relative movement between any of these components can be excited with vibration, creating large amounts of sound.

Various techniques have been implemented to reduce noise generation due to operation of a vibratory compaction roller. Many of these techniques are reasonably effective, but most are relatively costly to implement and/or add cost, size, weight, and/or complexity to the machine. For example, one design uses a specialized motor to drive the drum to rotate. Another design uses specialized bearings. Both designs add considerable cost and complexity to the roller.

The need therefore has arisen to provide a technique for reducing sound generation during operation of a vibratory compaction roller that is effective, yet relatively simple and inexpensive when compared to previously-known techniques.

SUMMARY OF THE INVENTION

In accordance with an aspect of the invention, the above-noted need is met by providing a vibratory compaction roller having a pretensioning mechanism that exerts a pretension or biasing force between the drum and the motor housing that inhibits relative axial movement between the output shaft of each drive motor and the associated motor housing.

The pretensioning mechanism may be provided between the motor and the drum that is driven by the motor. In one such arrangement, the pretensioning mechanism may take the form of one or more springs positioned between 1) a drum support that also supports the motor and 2) a hub of the drum. For example, one or more compression springs could be provided between the drum and the drum support. The spring(s) force the motor output shaft against the motor's thrust bearing, inhibiting relative movement between the output shaft and the motor housing. One or more additional bearing structure(s) could be provided between the spring(s) and the drum to accommodate rotational motion between each spring and the drum. In one embodiment, each such bearing structure comprises a bushing having an outer sleeve that extends into a bore that partially houses the spring and having an inner face that slides against the drum.

As another example, the pretensioning mechanism could be provided between the drum and the frame and could bias or pretension the drum away from the drive motor. For example, a bolt could be provided on the side of the machine opposite the drive motor and could draw the drum toward that side of the frame and, thus, away from the drive motor.

A pretensioning mechanism constructed in accordance with the invention may be used with walk-behind vibratory compaction rollers as well as other compaction rollers such as trench rollers and other remotely controlled rollers or with ride-on rollers. It also can be used with rollers having one, two, or even more driven drums, likely (but not strictly necessarily) with a separate pretensioning mechanism being associated with each driven drum.

In accordance with another aspect of the invention, a method is provided for reducing noise generation due to operation of a vibratory compaction roller by exerting a pretensioning or biasing force between each drive motor housing and the associated drum. The pretensioning may be achieved via operation of a pretensioning mechanism constructed as discussed above in conjunction with the first aspect of the invention. Incorporation of the pretensioning mechanism into the roller can reduce the noise that is generated upon machine operation by at least 2.5 dB, and even by 3.0 dB or more.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Figure 1:
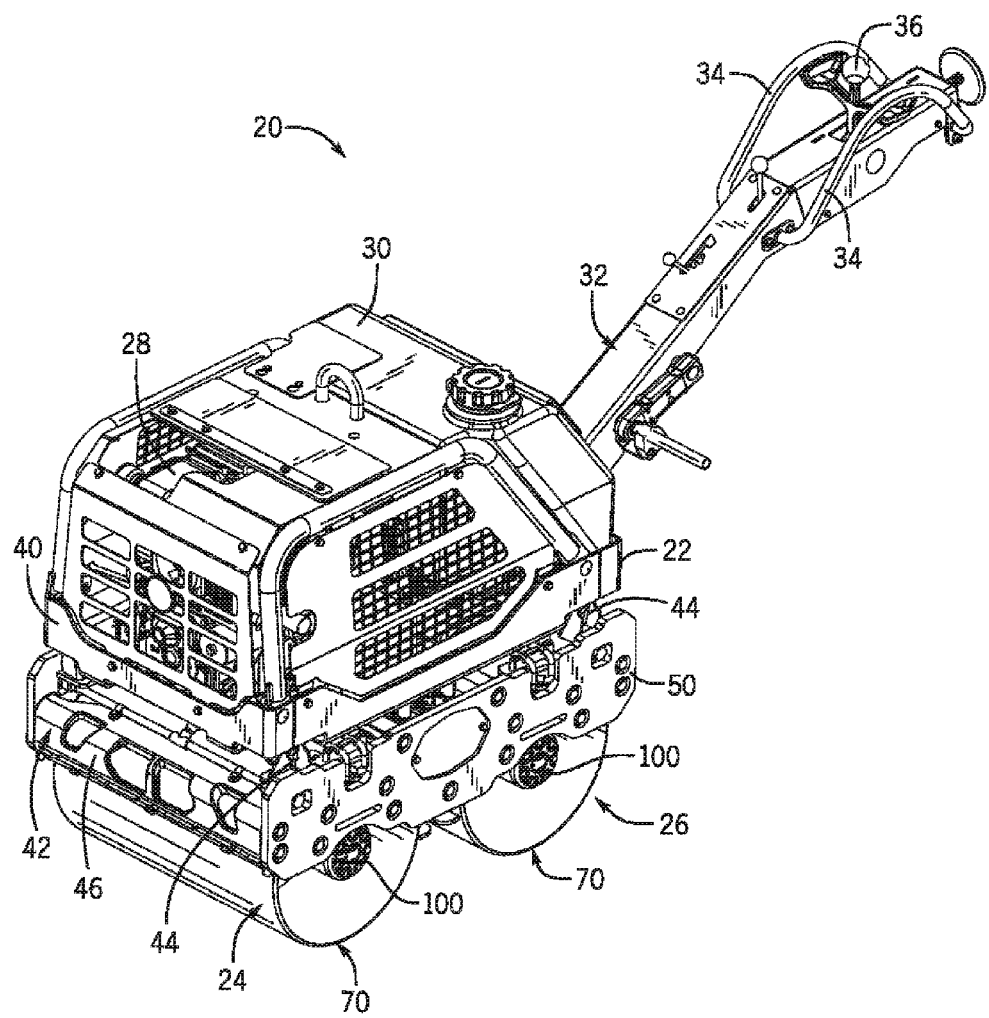
FIG. 1 is an isometric view of a walk-behind vibratory compaction roller having noise reduction features constructed in accordance with an embodiment of the invention.
Figure 2:
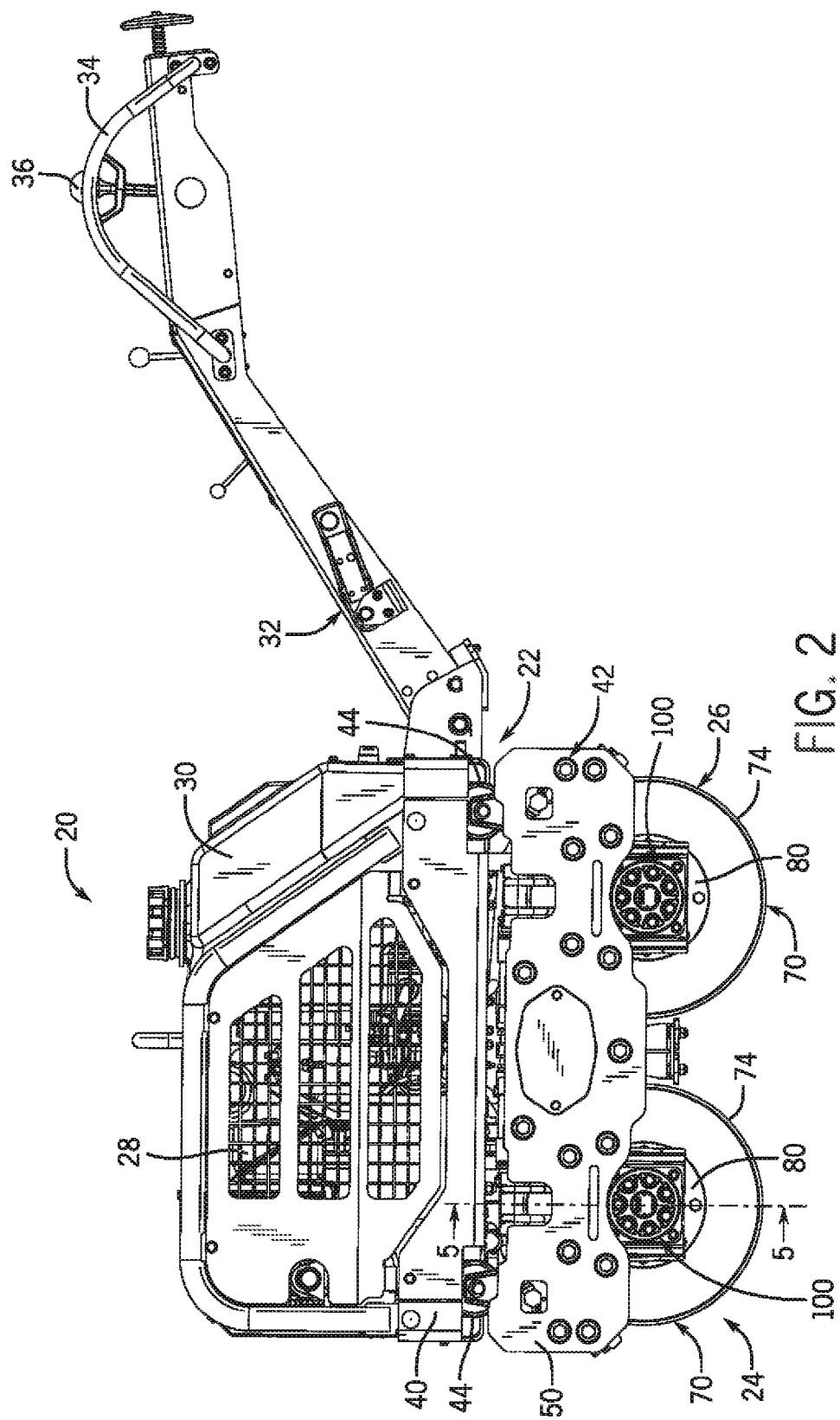
FIG. 2 is a left side elevation view of the vibratory roller of FIG. 1.
Figure 3:
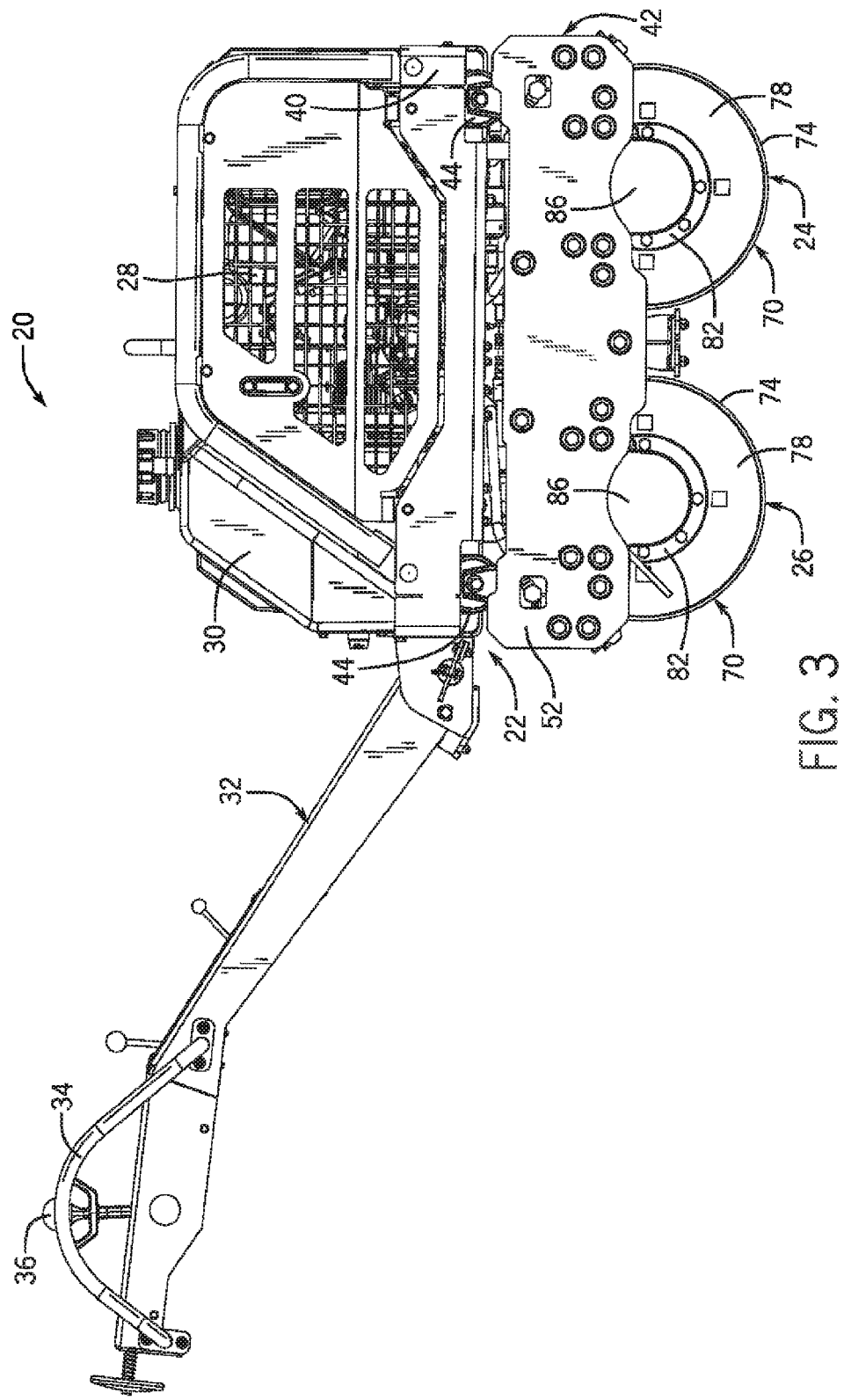
FIG. 3 is a right side elevation view of the vibratory roller of FIG. 1.

Referring initially to FIG. 1-3, a vibratory compaction roller 20 constructed in accordance with an embodiment of the invention is illustrated. Compaction roller 20 includes a frame 22, first and second drums 24 and 26 supporting the frame 22 on the ground, and an engine 28 and a hydraulic system (not shown) supported on the frame 22. Engine 28 can be provided in various configurations such as an electric, gasoline, or diesel engine. A diesel engine is illustrated and is supplied with fuel from a fuel tank (not shown). A water tank 30 supplies water for spraying on the surface immediately in front of the roller to prevent the material being compacted from congealing on the roller. The compaction roller 20 is steered and controlled by an operator (not shown) via a control handle assembly 32 extending rearwardly from the frame 22. The control handle assembly 32 includes a lever, one or more control handles 34, and one or more of an exciter control or propulsion control. One such control is shown at item 36, which controls the direction of roller propulsion. Other possible controls include a throttle control or throttle control assembly, an exciter controller for turning the exciter assembly on and off, and an emergency stop plunger or button.

The frame 22 of this embodiment includes upper and lower portions 40 and 42. The upper portion 40 of the frame 22 and the engine 28 and other components mounted on the upper portion 40 may be vibrationally isolated from the lower portion 42 by shock mounts 44 or the like. The lower frame portion 42 has front and rear cross beams 46 and 48 and left and right side support plates 50 and 52 that extend downwardly from respective sides of the frame 22.

Referring to FIGS. 1-4, the first drum 24 and second drum 26 are spaced longitudinally from one another to form respective front and rear drums that roll over and compact the ground surface associated with movement of compaction roller 20. Each drum 24, 26 is supported on first and second (left and right) support plates 50 and 52 of the frame 22.

Figure 4:
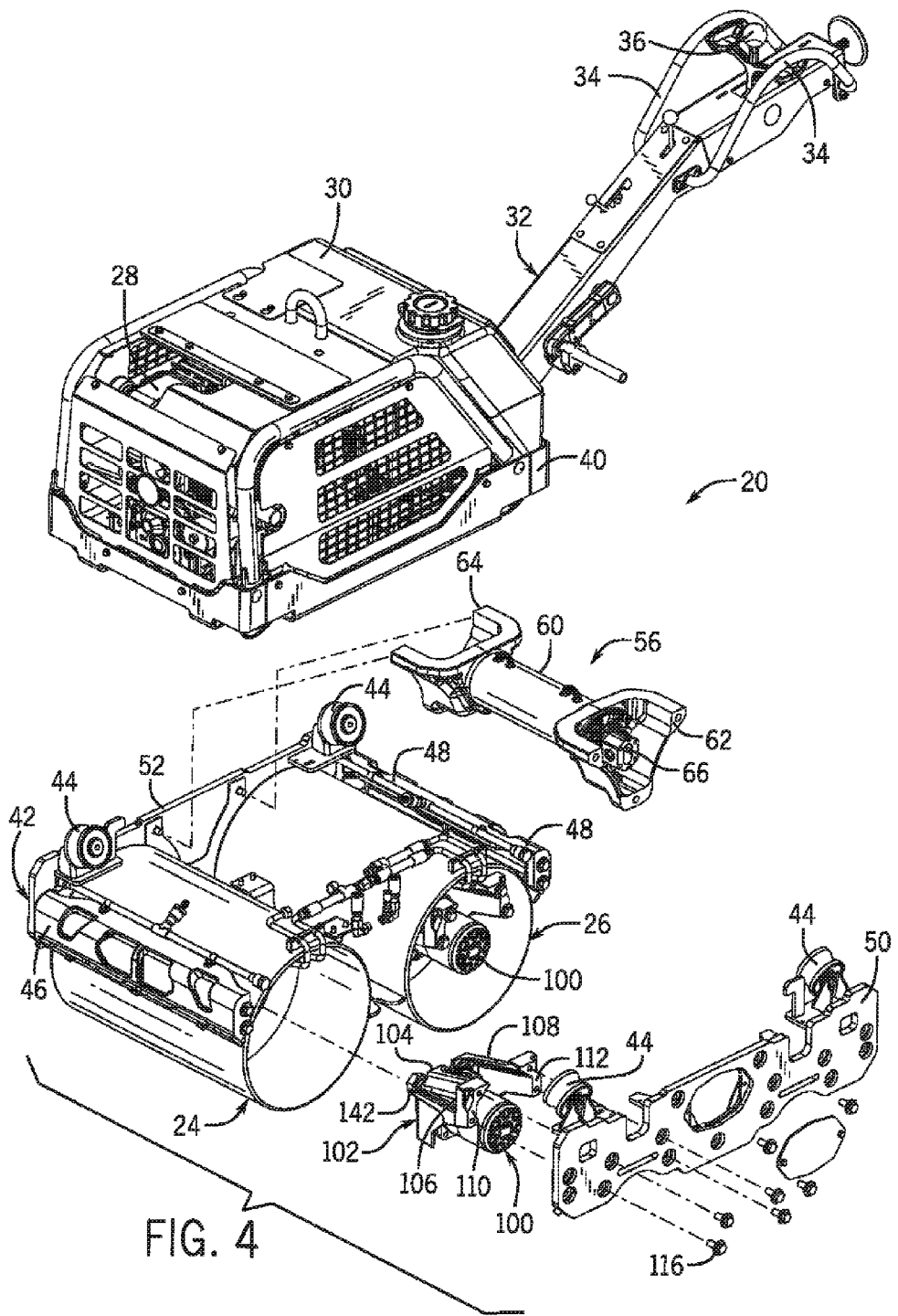
FIG. 4 is a partially exploded isometric view of the vibratory roller of FIG. 1.

One or both of drums 24, 26 can be directly or indirectly excitable so as to enhance the compaction performance associated with operation of compaction roller 20. In the illustrated embodiment in which the roller 20 is of a "center exciter" design, an exciter assembly 56 is located on the lower portion 42 of frame 22 between the two drums 24 and 26 to vibrate both drums 24 and 26. Referring to FIG. 4, the exciter assembly 56 of this embodiment includes an exciter housing 60 in which an eccentric weight assembly (not shown) is disposed. The eccentric weight assembly may comprise a shaft that is rotatably borne in the exciter housing 60 and one or more eccentric weights mounted on the shaft. The exciter housing 60 has left and right end mounts 62 and 64 that are bolted to the inside surfaces of the respective left and right support plates 50 and 52 of the lower frame portion 42. A hydraulic drive motor 66 is located within the left end mount 62. The hydraulic motor 66 is supplied with pressurized hydraulic fluid to selectively drive the shaft of the exciter assembly to rotate within the exciter housing 60. This rotation may be either unidirectional or bidirectional in nature. The hydraulic fluid may be supplied by an auxiliary pump (not shown) that is driven by the primary pump used to supply hydraulic fluid to the drive motors 100. As is known in the art, rotation of the shaft of the exciter assembly 56 causes the eccentric masses on the exciter shaft to generate vibrations. These vibrations are imparted to the drums 24 and 26 from the exciter housing 60 and the support plates 50 and 52.

Figure 5:
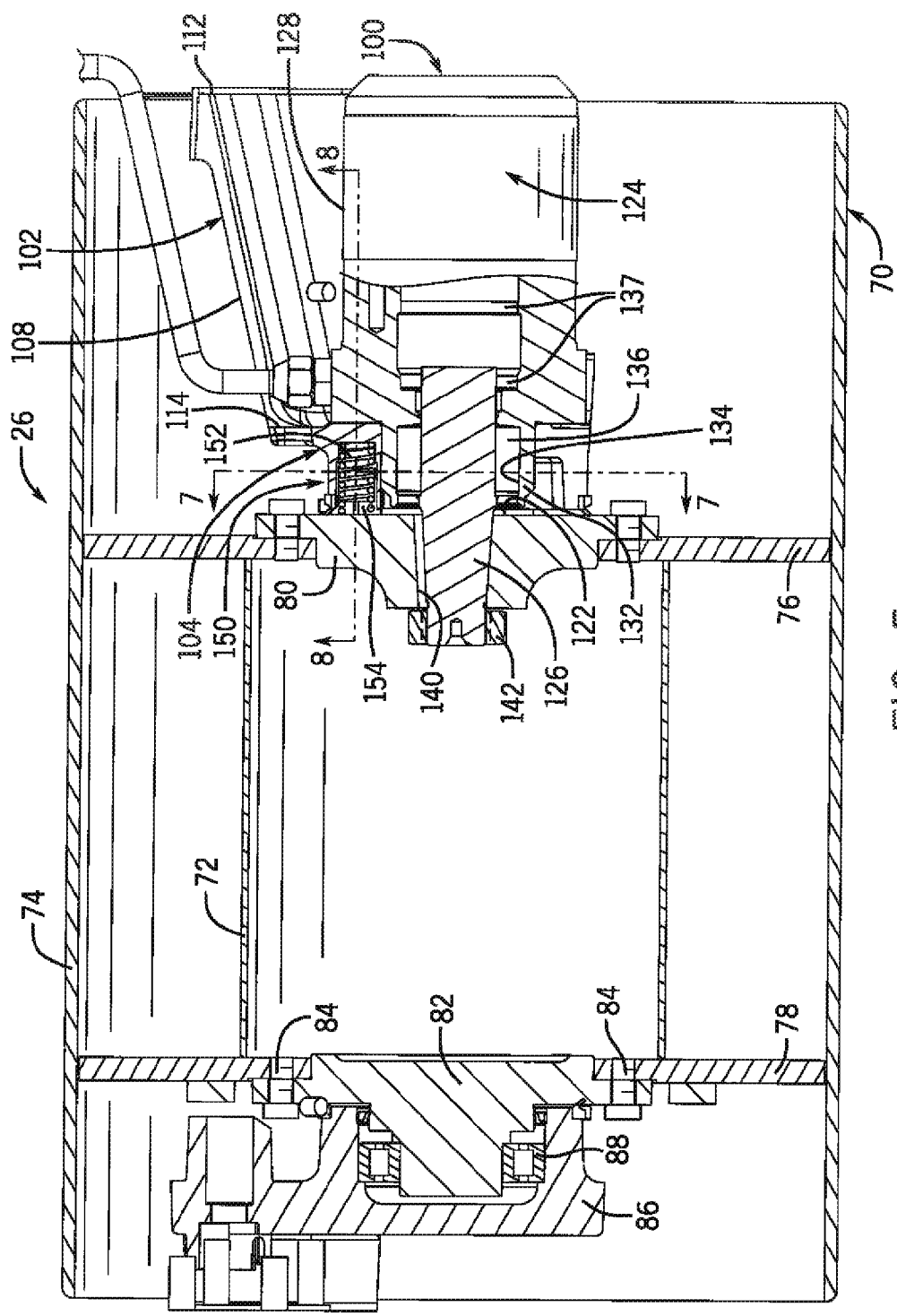
FIG. 5 is sectional plan view of the rear drum, the drive motor assembly, and both support plates of the vibratory compaction roller of FIG. 1.

Referring now to FIGS. 2, 4, and 5, the front and rear drums 24 and 26 are of identical construction. Only the rear drum 26 will be described, it being understood that the same description applies to the front drum 24. Rear drum 26 includes a compaction drum assembly 70 that is rotatably supported on the frame 22 and that is driven by a dedicated motor 100. Drum assembly 70 includes an inner support shell 72 and an outer ground-engaging shell 74 separated by an annular gap. The ends of the gap are closed by left and right end plates 76 and 78 that prevent dirt and debris from migrating into the center of the drum assembly 70. The end plates 76 and 78 are positioned axially inwardly from the ends of the shells 72 and 74 so that at least substantial portions of drum mounts and hydraulic motors can fit axially within the footprint of the drum 26. Drive and driven hubs 80 and 82 are attached to the respective end plates 76 and 78. More specifically, bolts 84 are inserted through circumferentially-spaced holes in an outer flange of each hub 80, 82 and are threaded into tapped bores in the associated end plate 76, 78. The left or drive hub 80 is driven by a hydraulic motor 100 as detailed below and supported on a left drum support 102 by the motor 100. The driven right drum 82 is rotatably borne in a right drum support 86 by a radial bearing 88. The right drum support 86 is bolted to the right plate 52 of the lower portion 42 of the frame 22.

The front and rear motors 100 of this embodiment and their related components are of identical design and are mounted in their respective drums 24 and 26 in an identical fashion. Hence, only the rear drive motor will be described, it being understood that this description applies equally to front rear motor.

Figure 6:
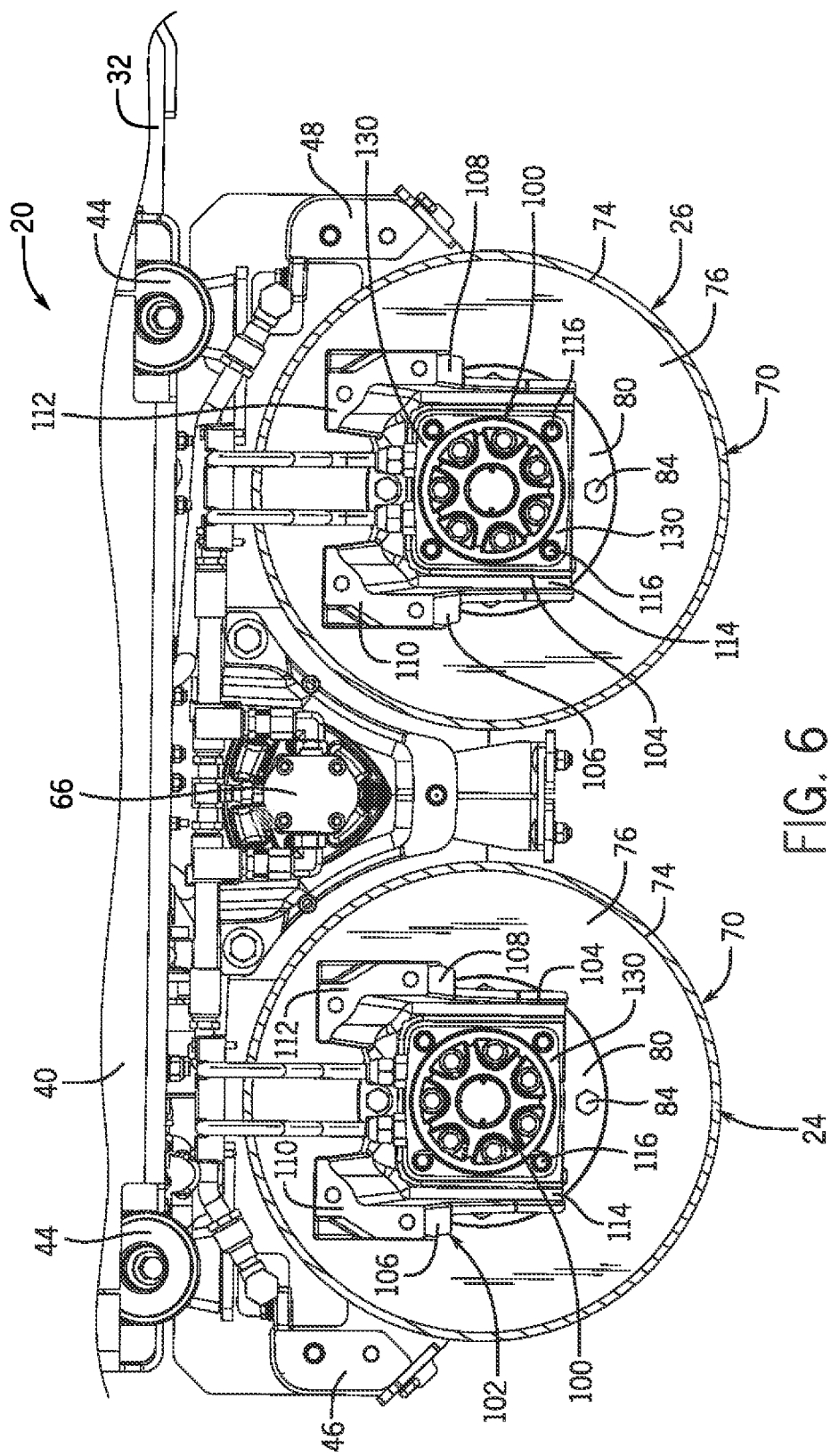
FIG. 6 is a left side elevation view of the vibratory compaction roller of FIG. 1, showing a portion of the lower frame assembly thereof removed.
Figure 7:
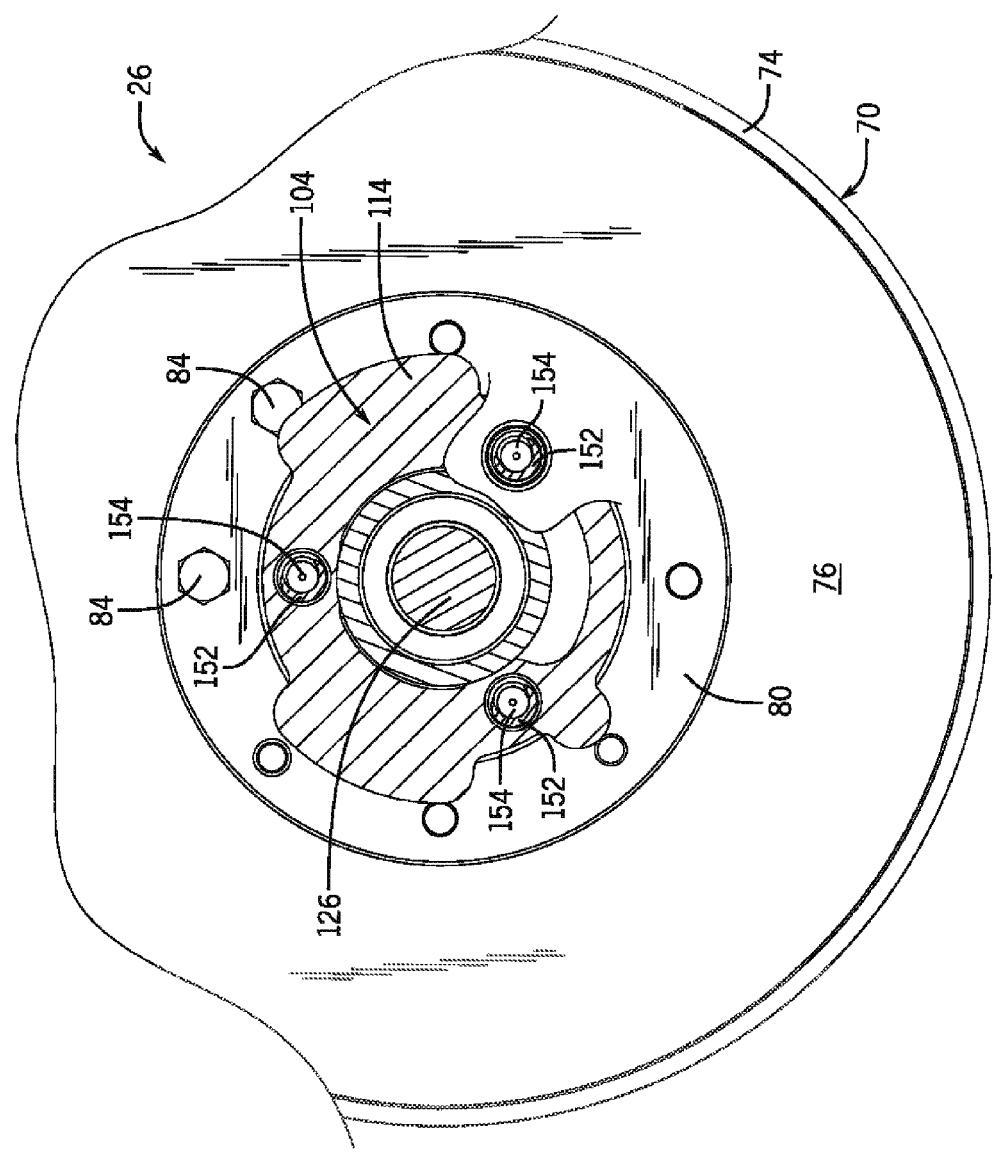
FIG. 7 is an end elevation detail view taken generally along the lines 7-7 in FIG. 5.
Figure 8:
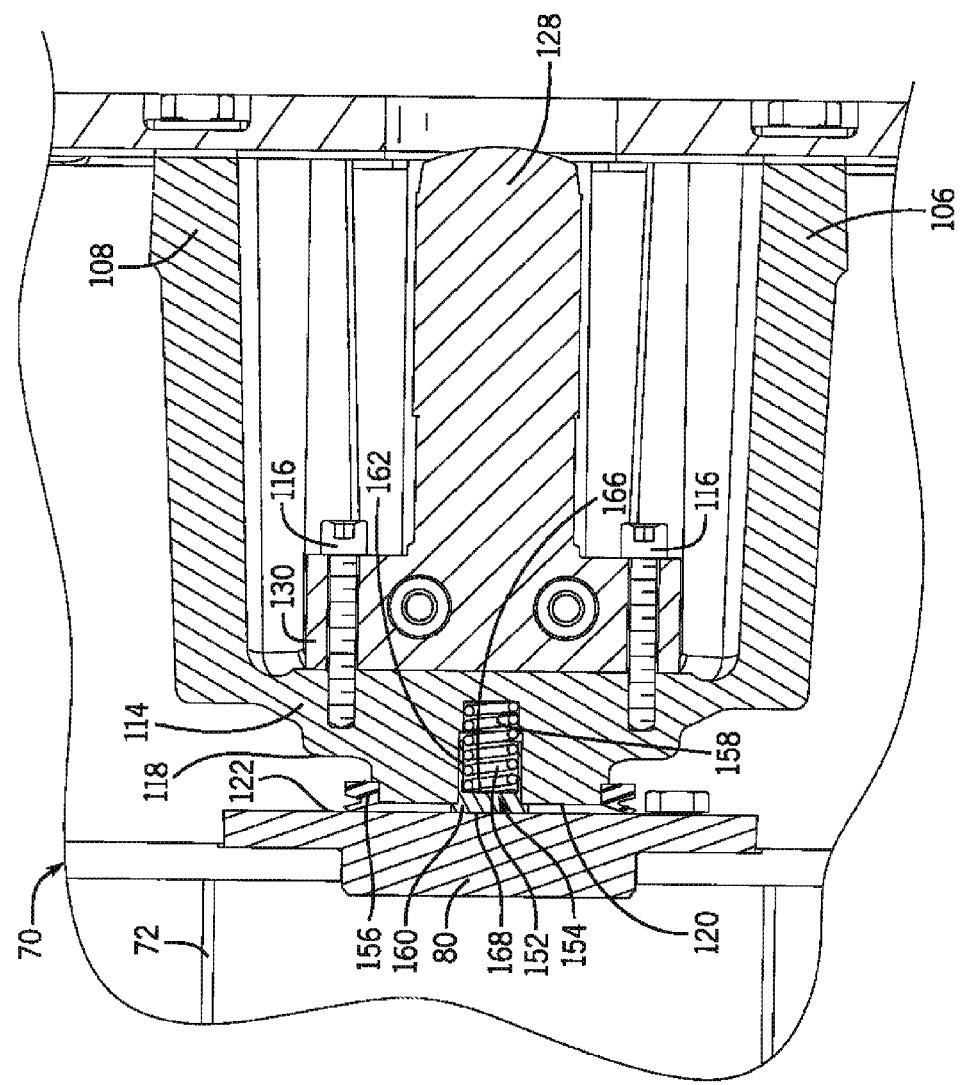
FIG. 8 is a side elevation detail view taken generally along the lines 8-8 in FIG. 5.

Referring particularly to FIGS. 4-6 and 9, motor 100 is mounted on the drum support 102 which, in turn, is bolted to the inside surface of the left support plate 50 of the lower frame portion 42. The drum support 102 of this embodiment is formed from a single casting, but could be formed from a frame assembly. As best seen in FIGS. 4-6, the drum support 102 has an inner motor mounting portion 104 and two longitudinally-spaced upper support portions 106 and 108 that extend outwardly and upwardly from the motor mounting portion 104. An outer end surface 110 and 112 of each support portion 106, 108 is bolted to the inner surface of the left side plate 50. The inner motor mounting portion 104 includes a mounting flange 114 that is generally rectangular in shape. Spaced holes are formed in the flange 114 for receiving bolts 116 that mount the motor housing 124 on the flange 114. An annular boss 118 extends axially inwardly from an inner radial edge of the flange 114. This boss 118 surrounds an inner axial end portion of the motor housing body (detailed below) and terminates in an annular surface 120 that faces an outer surface 122 of the hub 80. The pretensioning mechanism 150 of this embodiment acts on the boss 118 and on the adjacent hub outer surface 122.

The motor 100 is a hydraulically driven motor, mounted on the left drum support 102. The motor 100 of this embodiment is a so-called "wheel motor" which is capable of transmitting relatively high torques and withstanding axial loads. One suitable wheel motor can transmit 83,000 kpa in an intermittent fashion and about 60,000 kpa in a continuous manner and withstand axial loads of over 4,450 N and side loads of up to about 35,000 N. A suitable wheel motor is available from Parker Hannifin. That motor may be a so-called TH Series motor having a displacement of about 280 cm3.

Figure 9:
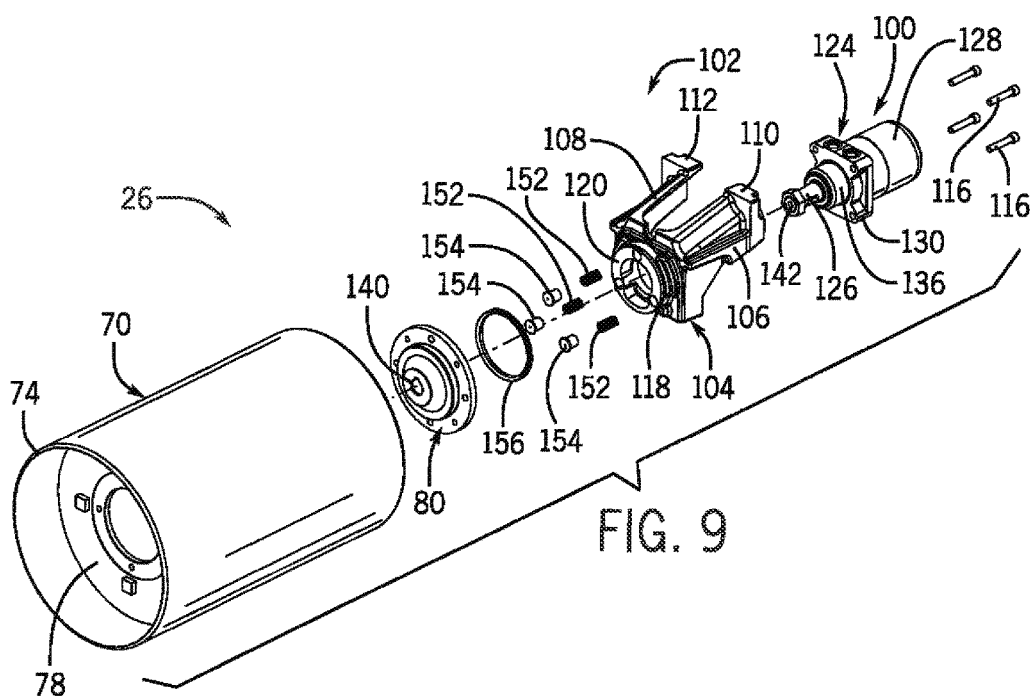
FIG. 9 is an exploded isometric view of a pretensioning mechanism and related components of the vibratory roller of FIG. 1.

As best seen in FIGS. 5, 6, and 9, motor 100 includes a housing 124 and a driven shaft 126 extending axially inwardly from the housing 124 for cooperation with the hub 80 of the drum assembly 70. The housing 124 includes a cylindrical body 128 and a generally rectangular mounting plate 130 provided on an inner end portion of the body 128. The mounting plate 130 extends radially beyond the perimeter of the housing body 128 and receives the bolts 116 for connecting the motor 100 to the mounting flange 114 of the drum support 102 as discussed above. The cylindrical housing body 128 is of reduced diameter at its inner end portion 132 so as to be surrounded by the boss 118 of the drum support 102. This reduced diameter end portion 132 has a stepped internal bore 134 that receives the driven shaft 126 as well as a radial bearing 136 supporting the driven shaft 126 on the housing body 128. Thrust bearings 137 are positioned axially outwardly of the radial bearing 136 adjacent an end of the shaft 126. The bearing 136 is a free-floating radial bearing and, as such, need not be accompanied by a snap ring. Unwanted shaft movement relative to the motor 100 instead is prevented by the pretensioning mechanism 150, which biases the end of the shaft 126 against the thrust bearings 137 as discussed below. The driven shaft 126 extends axially inwardly from the housing body 128 and is splined to a tapered bore 140 of the driven hub 80. A nut 142 is threaded onto the inner end of the shaft 126 and engages the inner surface of the hub 80. The motor 100 is supplied with pressurized hydraulic fluid from the pump via hydraulic hoses as seen in FIGS. 5 and 6.

The inventors have discovered that, in a vibratory compaction roller constructed generally as thus far described to the extent that it has a wheel motor, a free-floating roller bearing, and thrust bearings associated with each drum, a significant amount of noise is generated during machine operation due to relative axial movement between the motor output shaft and the motor housing and the drum support. This range of motion typically is of the order of about 0.4 mm. The inventors further discovered that, by preventing or at least substantially reducing this axial movement, the resultant sound amplification can be dramatically reduced.

A pretensioning mechanism achieves the desired results. This pretensioning mechanism could take any of a number of forms. For example, as discussed below in conjunction with FIG. 11, it could force the drum away from the motor without directly imposing any forces on the drum support on which the motor is mounted or on the motor itself. Alternatively, as is the case with the embodiment illustrated in FIGS. 5-9 and discussed immediately below, it also could more directly force the motor support and drum apart. A pretensioning mechanism of this type could, for instance, take the form of a wave spring or other biasing mechanism that extends partially or completely around the circumference of the motor in a segmented or un-segmented manner.

In the illustrated embodiment of FIGS. 5-9, the biasing mechanism 150 takes the form of a number of spaced compression springs 152 that bias the drum support 102 and hub 80 apart, forcing the motor output shaft 126 against the thrust bearings 137 and preventing relative axial movement between the motor output shaft 126 and the motor housing 128 and the drum support 102. Each spring 152 has opposed ends exerting biasing forces on the hub 80 of the drum and on the drum support 102, respectively. Three such springs 152 are provided in the illustrated embodiment, separated by 120°. It is conceivable that fewer springs could be employed, albeit at the risk of binding or non-uniform wear on the springs. More springs also could be employed, albeit at additional expense. The springs 152 must accommodate rotational motion of the hub 80 relative to the motor 100 during a ground compaction operation. They thus preferably, but not necessarily, are accompanied by bearings that are of relatively low friction when compared to the springs so as to facilitate that sliding motion without binding and to reduce component wear. In the illustrated embodiment, these bearings are formed on bushings 154 that double as spring seats. An elastomeric sealing ring 156 is mounted in a groove at the outer end of the boss 118 of the drum support 102 for sealing against the outer surface of the hub 80 in order to prevent the ingress of debris into the spring assemblies.

Referring to FIGS. 5 and 7-9, the compression springs 152 are mounted in three circumferentially-spaced bores 158 extending axially outwardly from the annular inner surface 120 of the boss 118 on the left drum support 102. The outer end of each spring 152 engages an inner end of the associated bore 158. The inner end of each spring 152 is received in the corresponding bushing 154. Each compression spring 152 may be formed of steel.

Figure 10:
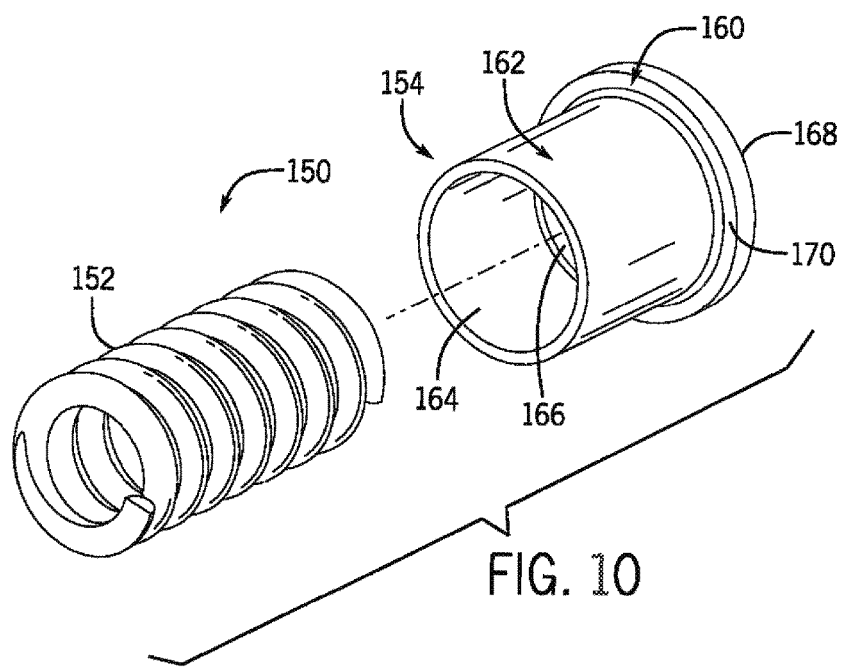
FIG. 10 is an exploded isometric view of a spring and bushing assembly of the pretensioning mechanism of FIG. 9.

As best seen in FIG. 10, each bushing 154 has an inner bearing portion 160 and an outer sleeve 162. The sleeve 162 of each bushing 154 extends into the associated bore 158 sufficiently to prevent the bushing 154 from tipping as it wears. Sleeve 162 is hollow so as to form a cavity 164 that receives an inner end of the associated spring 152, which is seated on an inner end 166 of the cavity 164. The inner end of the inner bearing portion 160 terminates in a hub engagement face 168 that serves as a bearing surface. The bearing surface slides against the outer surface 122 of the hub 80 during machine operation. The bushing 154 is stepped to form a shoulder 170 at the juncture of the bearing portion 160 and the sleeve 162. As a result, the bearing portion 160 is substantially wider than the sleeve 162, preventing the bushing 154 from being pressed into the bore 158.

The dimensions and composition of the springs 152 and bushings 154, as well as the individual and aggregate biasing forces imposed by the springs 152, are largely a matter of designer preference and optimally would vary from application to application. Preferably, the illustrated system is designed such that the aggregate biasing force is imposed by the springs 152 is in the range of 1,500 N and 2,500 N, and most preferably of about 2,000 N.

The bushing 154 should be formed of a material that is strong and durable and yet has a relatively low coefficient of sliding friction. A suitable material is manufactured by Igus under the trade name I Glide™. The I Glide™ P210 material has been found to be particularly well-suited. That material has a shore D hardness of about 75 and a coefficient of dynamic friction at the inner contact face of about of 0.06 to 0.21 when sliding against steel. Friction and wear can be reduced by forming the mating surface 122 of the hub 80 from heat-treated steel.

In operation, the vibratory roller compactor 20 is controlled by an operator stationed behind the machine via operation of the controls on the handle assembly 32. The machine 20 is driven by supplying pressurized hydraulic fluid to the front and rear drive motors 100 from the pump (not shown) and the supply and return lines. Drive torque is transmitted to the hubs 80 of the drums 24 and 26 from the motor output shafts 126. The machine 20 can be controlled to travel either in forward or reverse typically at maximum speeds on the order of 5 kph in the forward direction and 2.5 kph in the reverse direction. In the illustrated embodiment in which the diameter of a circle connecting the centers of the bushings 154 is about 110 mm, this translates into a maximum linear velocity of 0.33 m/s at the points of contact of the center of the bushings against the hub. At the same time, the exciter assembly 56 is driven to impart vibrations to the drums 24, 26 under the power of the hydraulic motor 66. These vibrations are transmitted from the exciter assembly 56, to the exciter housing 60, to the lower frame 42, to the drum supports 86, 102, and to the drums 24, 26.

Axial movement of the motor output shaft 126 relative to the motor housing 128 that otherwise would amplify vibration-induced noise is prevented or at least significantly reduced by the pretensioning force applied by the springs 152. This pretensioning force has been found to significantly reduce the generation of noise that would otherwise be created during machine operation. Specifically, tests were conducted in conformance with ISO 3744 standards on a Wacker Neuson RD7 model machine for the determination of sound power levels and the sound energy levels of noise sources using sound pressure. Machines were tested with and without the pretensioning mechanisms described above in conjunction with FIGS. 1-10. The vibration amplitude generated by the machine's exciter assembly was dependent upon engine speed. The tests were conducted at maximum rated vibration generation levels that are produced at a full-throttle operating condition in which the engine runs at about 2,600 RPM. The tests demonstrated that the sound generated upon roller operation was reduced by about 8 dB with the incorporation of the pretensioning mechanism. Since each three-decibel drop represents a reduction in sound generation of about one half, this difference represents an about 8× reduction in noise generation.

Figure 11:
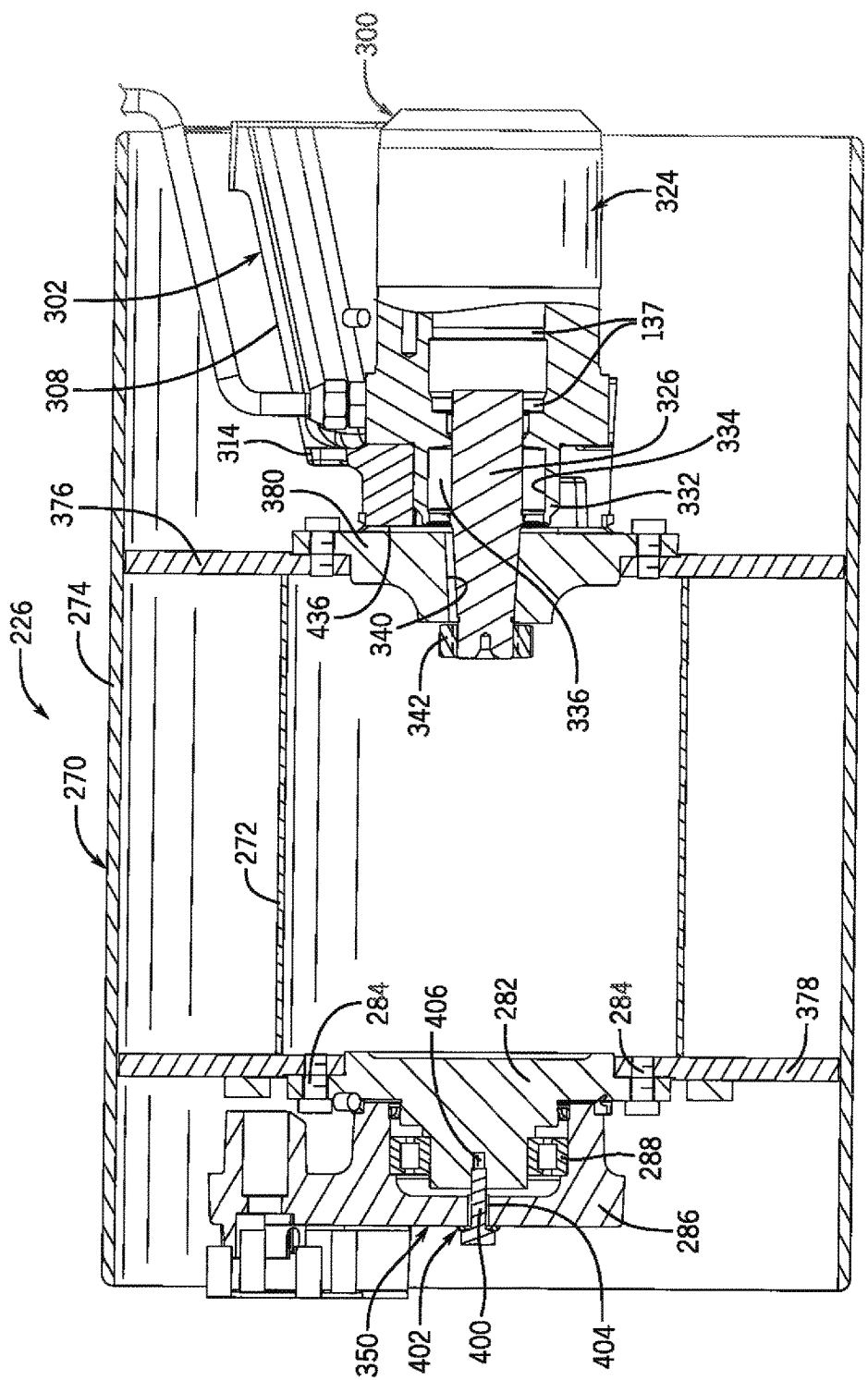
FIG. 11 is sectional plan view of the front drum, the drive motor assembly, and both side support plates of a vibratory compaction roller incorporating a pretensioning mechanism constructed in accordance with a second embodiment of the invention.

As mentioned above, other pretensioning mechanisms could be used instead of or in addition to the one described above so long as the pretensioning mechanism tends to force the drum and motor apart from one another. One such alternative pretensioning mechanism 350 is illustrated in FIG. 11, which illustrates a drum 226 and its associated drive motor assembly and frame arrangement. The drum 226, motor 300, and many other components are essentially identical to the corresponding structures of the first embodiment and, accordingly, are designated by the same reference numerals, incremented by 200.

The assembly of FIG. 11 differs from the assembly of FIGS. 1-10 only in that the pretensioning mechanism 350 is provided on the right or non-driven side of the machine as opposed to the left or driven side of the machine as in the first embodiment. This pretensioning mechanism 350 draws the drum 226 away from the motor 300 without directly contacting the drum support 302 rather than by directly biasing the drum 226 and drum support 302 apart from one another. Hence, the springs, bushings, and related structures of the first embodiment are eliminated. Instead, a bolt 400 and bushing 402 are provided at the undriven side of the machine. The bolt 400 and bushing 402 are inserted through a bore 404 in the right drum support 286. The bolt 400 is threaded into a tapped bore 406 formed in the outer surface of the adjacent hub 382. Appropriate tensioning of the bolt 400 pretensions the drum 226 to the left as seen in FIG. 11. This pretensioning pulls the drum 226 away from the motor 300 and drum support 302 on the left side of the machine to achieve a similar effect of that achieved above in conjunction with the discussion of the pretensioning mechanism 150 of the first embodiment. Rotational movement of the bolt 400 relative to the drum support 380 is accommodated by the bushing 402, which may be formed from the same I Glide™ P210 material as the bushings of the first embodiment.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the drawings and the appended claims.

We claim:

1. A vibratory compaction roller comprising:
   a frame;
   first and second longitudinally-spaced rotatable drums that supports the frame on a surface to be compacted, each drum having a cylindrical outer surface and first and second ends that are rotatably supported on the frame;
   an exciter assembly that transmits vibrations to the first drum;
   a drive motor that is supported on the frame and that imparts rotational drive torque to the first end of the first drum; and
   a pretensioning mechanism that forces the motor and the first drum apart; wherein the motor is a wheel motor and the pretensioning mechanism comprises a spring that pushes an output shaft of the motor against a thrust bearing of the motor.

2. The vibratory compaction roller as recited in claim 1, wherein the exciter assembly is located longitudinally between the first and second drums.

3. The vibratory compaction roller as recited in claim 1, wherein the frame has first and second sides on which hubs on the respective first and second ends of each of the first and second drum are rotatably borne, wherein the motor is a hydraulic wheel motor which is mounted on the first side via a drum support and which has an output shaft that is rotatably borne by a bearing, and wherein the hub on the first end of the first drum is affixed to an output shaft of the wheel motor so as to rotate therewith.

4. The vibratory compaction roller as recited in claim 3, the pretensioning mechanism comprises a spring that pushes the motor output shaft against the bearing.

5. The vibratory compaction roller as recited in claim 4, wherein the pretensioning mechanism comprises a plurality of compression springs that are spaced circumferentially around the output shaft of the motor.

6. The vibratory compaction roller as recited in claim 5, further comprising a bearing structure that is positioned axially between an inner end of each spring and the first drum and that slides against the first drum upon drum rotation relative to the frame.

7. The vibratory compaction roller as recited in claim 6, wherein each spring is mounted in an associated axial bore formed in an inner end face of the drum support, and wherein each bearing structure comprises a stepped bushing having 1) an inner face that slides against the first drum and 2) an outer sleeve that is received within an associated bore and that receives an inner end of an associated spring.

8. The vibratory compaction roller as recited in claim 5, wherein the pretensioning mechanism imposes a separating force on the motor mount of between 1500 N and 2500 N.

9. The vibratory compaction roller as recited in claim 1, wherein the pretensioning mechanism comprises a bolt that extends through the frame and that is threaded into a tapped bore in the second end of the first drum.

10. A vibratory compaction roller comprising:
a frame having first and second opposed sides;
first and second longitudinally-spaced drums that support the frame on a surface to be compacted, each drum having a cylindrical outer surface and first and second hubs that are rotatably supported on the respective sides of the frame via respective first and second drum supports;
an exciter assembly that transmits vibrations to at least one of the drums;
first and second hydraulic wheel motors, each of which has an output shaft and a housing that is mounted on an associated drum support, wherein the output shaft is connected to the first hub of the associated drum so as to deliver drive torque thereto; and
first and second pretensioning mechanisms, each of which pushes the output shaft of the respective motor against an associated thrust bearing so as to inhibit relative axial movement between the motor output shaft and the motor housing, each pretensioning mechanism including a plurality of circumferentially-spaced compression springs that surround the output shaft of the associated motor and a plurality of bearing structures, each of which is positioned axially between an inner end of an associated spring and the associated first hub and each of which slides against the associated first hub upon drum rotation relative to the frame.

11. The vibratory compaction roller as recited in claim 10, wherein each spring is mounted in an associated axial bore formed in an inner end face of the associated drum support, and wherein each bearing structure comprises 1) a stepped bushing having an inner face that slides against the associated first hub and 2) an outer sleeve that is received within an associated bore in the drum support and that receives an inner end of the associated spring.

12. A method of operating a vibratory compaction roller having a frame and first and second longitudinally spaced drums that rotatably support the frame on a surface to be compacted and that are mounted on the frame, the method comprising:
driving the first drum to rotate via operation of a motor supported on the frame adjacent a first end of the first drum;
imparting vibrations to the first drum via operation of an exciter assembly; and
forcing the first drum and motor apart via operation of a pretensioning mechanism; wherein the motor is a wheel motor and the pretensioning mechanism comprises a spring that pushes an output shaft of the motor against a thrust bearing of the motor.

13. The method as recited in claim 12, wherein the pretensioning mechanism imposes a separating force of between 1500 N and 2500 N.

14. The method as recited in claim 13, wherein the pretensioning mechanism reduces sound generated upon operation of the vibratory compaction roller at maximum rated vibration generation levels by at least 2.5 dB when compared to operation of the same vibratory compaction roller at rated vibration generation levels without the pretensioning mechanism.

15. The method as recited in claim 14, wherein the pretensioning mechanism reduces sound generated upon operation of the vibratory compaction roller at maximum rated vibration generation levels by at least 3.0 dB when compared to operation of the same vibratory compaction roller at rated vibration generation levels without the pretensioning mechanism.

16. The method as recited in claim 12, wherein
the frame has first and second sides on which hubs on the respective first and second ends of each of the first and second drums are rotatably borne, wherein the motor is a hydraulic wheel motor which is mounted on the first side via a drum support and which has an output shaft that is rotatably borne in the drum support by a bearing, and wherein the hub on the first end of the first drum is affixed to an output shaft of the wheel motor so as to rotate therewith, and wherein
the pretensioning mechanism comprises a plurality of compression springs that are spaced circumferentially around the output shaft of the motor.

17. The method as recited in claim 12, wherein
the frame has first and second sides on which hubs on the respective first and second ends of the drum are rotatably borne, wherein the motor is mounted on the first side of the frame via a drum support and has an output shaft that is rotatably borne on the drum support by a bearing, and wherein the hub on the first end of the first drum is affixed to an output shaft of the motor so as to rotate therewith, and wherein
the pretensioning mechanism comprises a bolt that extends through the frame and that is threaded into a tapped bore in the hub on the second end of the first drum.

\* \* \* \* \*